United States Patent [19]

Ouchi et al.

[11] Patent Number: 5,036,182
[45] Date of Patent: Jul. 30, 1991

[54] BAR CODE READING AND DECODING APPARATUS

[75] Inventors: Junichi Ouchi; Koji Nakase; Hiroaki Sasaki, all of Furukawa, Japan

[73] Assignee: Alps Electric Co., Ltd., Tokyo, Japan

[21] Appl. No.: 324,853

[22] Filed: Mar. 17, 1989

[30] Foreign Application Priority Data

Jun. 21, 1988 [JP] Japan .................................. 63-151306

[51] Int. Cl.⁵ ........................... G06K 7/01; G06K 5/00
[52] U.S. Cl. ...................................... 235/462; 235/463
[58] Field of Search ............... 235/462, 472, 463, 466, 235/470

[56] References Cited

U.S. PATENT DOCUMENTS

| | | | |
|---|---|---|---|
| 4,488,678 | 12/1984 | Hara et al. | 235/462 |
| 4,608,487 | 8/1986 | Awane et al. | 235/462 |
| 4,757,206 | 7/1988 | Ohta | 235/463 |
| 4,797,940 | 1/1989 | Sato | 235/470 |
| 4,855,581 | 8/1989 | Mertel et al. | 235/463 |
| 4,859,840 | 8/1989 | Hasegawa et al. | 235/463 |

FOREIGN PATENT DOCUMENTS 63-16999 8/1989 Japan .
63-30030 8/1989 Japan .

OTHER PUBLICATIONS

Japanese Industrial Standards (JIS) B9550-1987, (pp. 1-14).
"Construction of Bar Code System", No. 4, (pp. 179-199).

Primary Examiner—Stuart S. Levy
Assistant Examiner—Robert Weinhardt
Attorney, Agent, or Firm—Guy W. Shoup; David W. Heid

[57] ABSTRACT

A bar code reading apparatus for detecting the space between characters (the character space) by counting the number, which is a fixed number in the bar code, of edges, or transition points, of the bars and spaces for each character code, and either inhibits the count value by its bar/space width counter for the space beyond the fixed number of bars/spaces for one character (i.e., the count value for the character space) from being supplied to its decoder portion, or supplies the decoder portion with a specific code which the decoder will neglect in decoding, whereby the character space is prevented from adversely affecting the bar code reading.

5 Claims, 15 Drawing Sheets

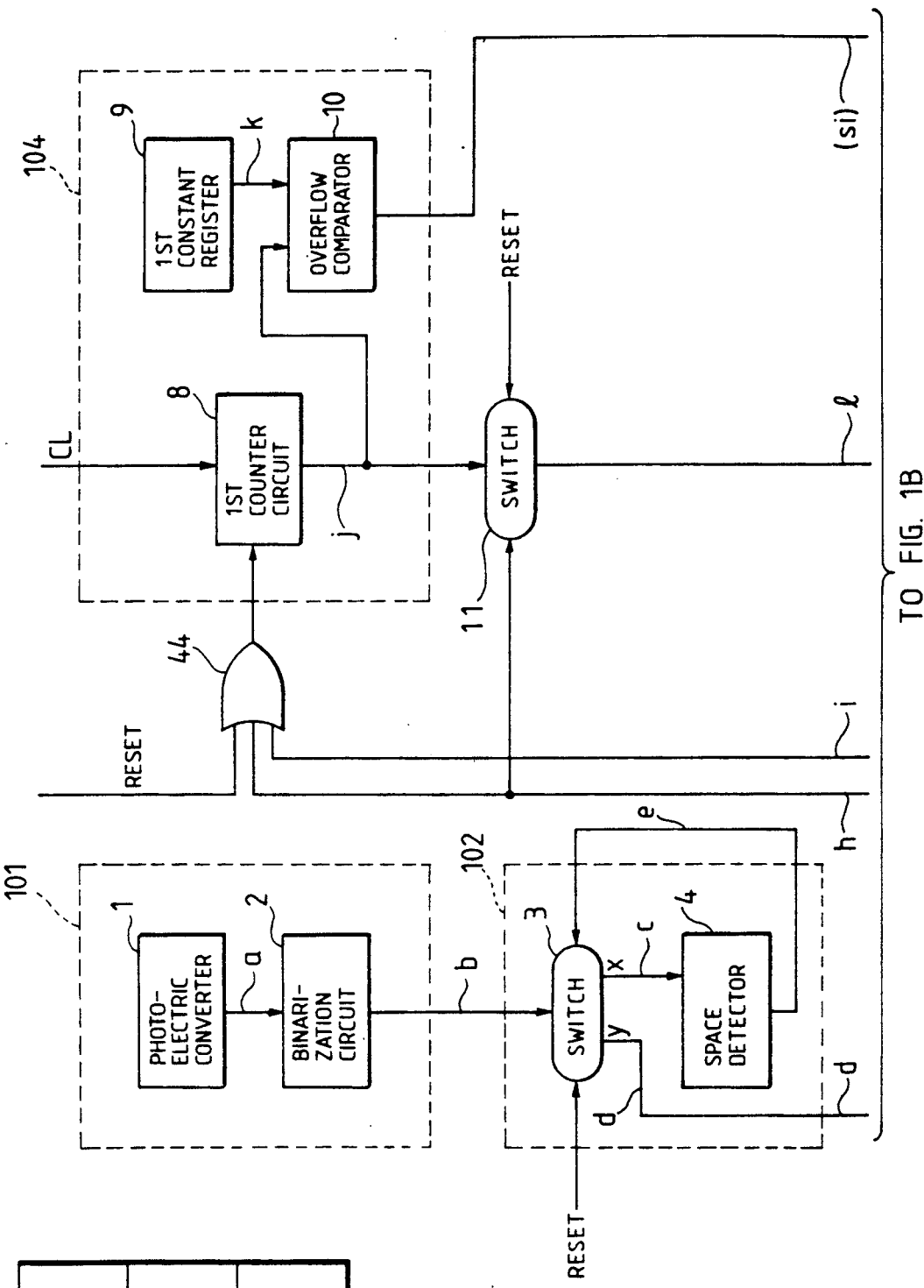

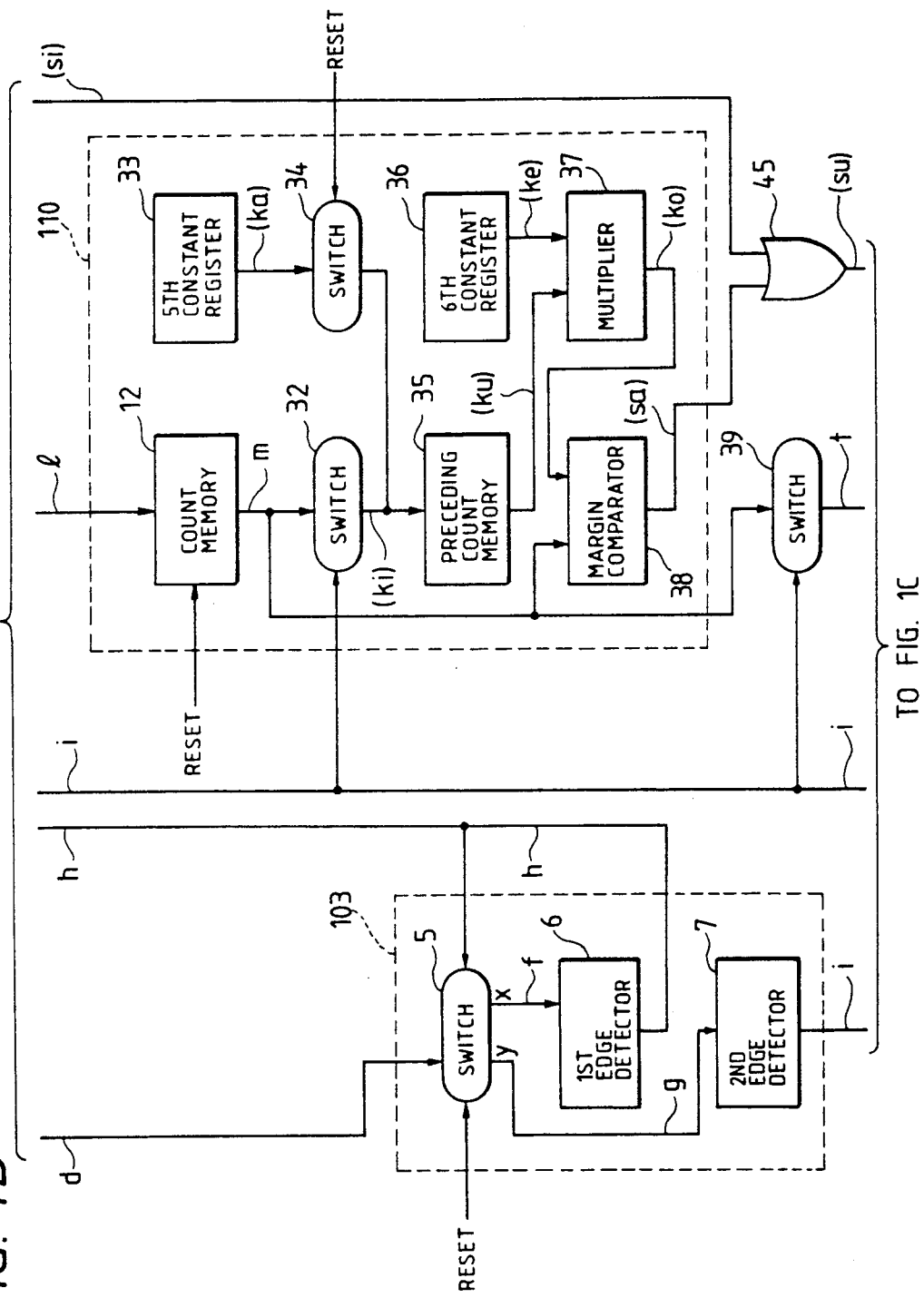

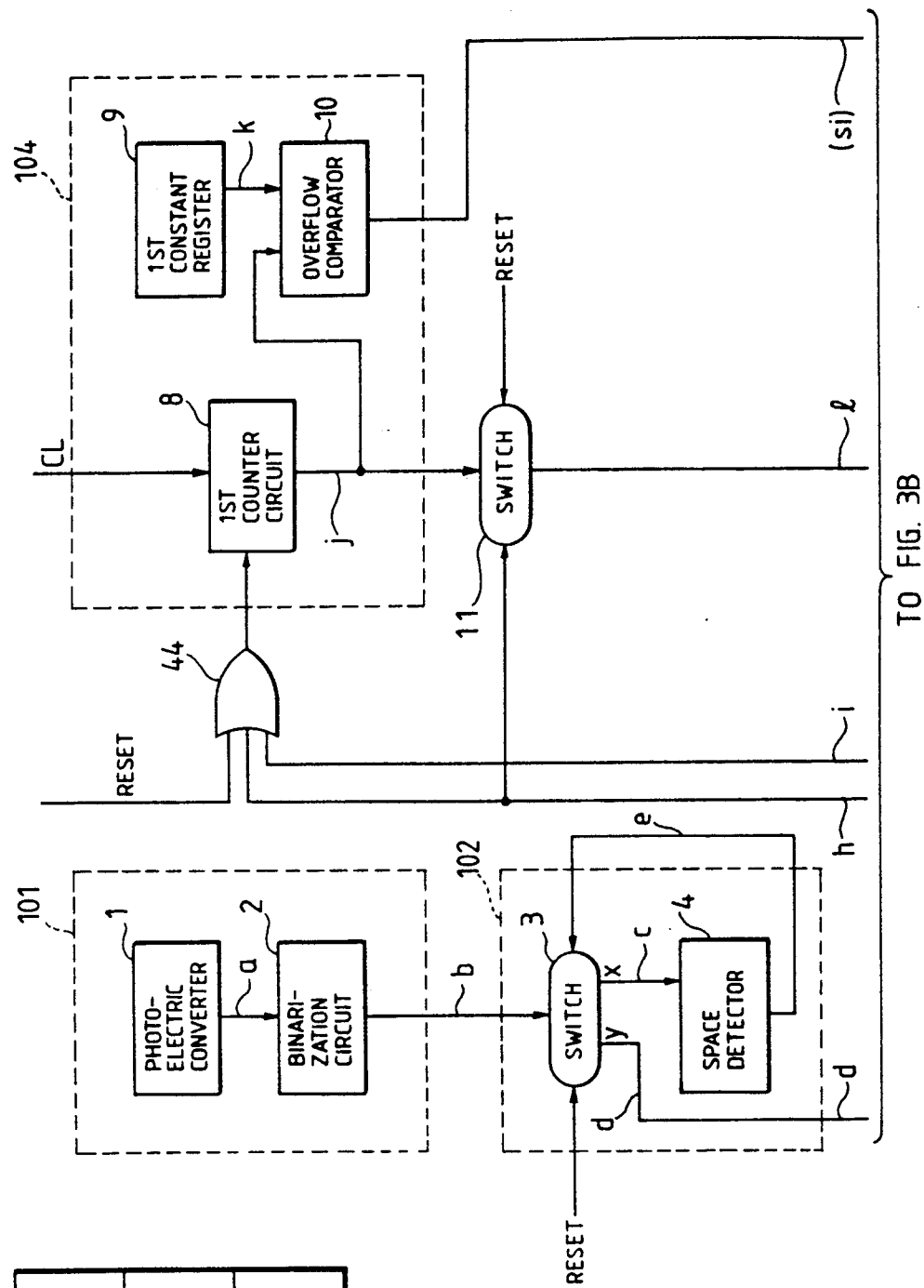

| FIG. 4A |
| FIG. 4B |
| FIG. 4C |

5,036,182

BAR CODE READING AND DECODING APPARATUS

BACKGROUND OF THE INVENTION

1. Field of the Invention

The present invention relates to a code reading apparatus for converting a bar code arranged in a printed pattern on a medium into an electric signal by decoding the bar code, with the use of a photoelectric converter, into data processable by an information processing apparatus and outputting the data to such an apparatus, and more particularly, to a code reading apparatus free from reading errors caused by variations in the reference level for determination in decoding characters, which constitutes the bar code and represents plural pieces of information, due to intercharacter space (hereinafter, to be briefly called "character space") existing between characters, and therefore having a high degree of freedom for the size of the character space.

2. Description of the Prior Art

Bar code input systems are known as means for inputting data into information processing apparatus such as computers. Recently, the bar code input system have come to be widely used for sales control principally dealing with such data as kinds of goods and prices, for program reserving in a VTR, and for data inputting in checking performance of and operating and controlling industrial equipment and consumers appliances.

As to standards of such bar codes, detailed descriptions are given in Japanese Industrial Standards (JIS) B9550-1978, or a paper entitled "Construction of Bar Code System", Sensor Interfacing, No. 4, an extra issue of Transistor Technology, CQ Publishing Company, July 1, 1984, pp. 179 to 199.

FIG. 6 shows an NW-7 code pattern as an example of symbols of the bar code and explains the structure of the code; FIG. 6(a) is a drawing showing a full symbol which represents five characters C1 to C5 and FIG. 6(b) is an enlarged partial view of the same.

The code pattern shown in FIG. 6(a) is constituted of start/stop codes S/S and five succeeding character codes C1 to C5 and, as shown in FIG. 6(b), it has character spaces CS between the characters and between the start/stop codes and the characters (the character CN in FIG. 6(b) represents "0000110"). The code indicated in FIG. 6(a) is such as is adapted to be read both in the direction indicated by the arrow and in the opposite direction.

The reading of the codes is performed in such a way that two levels of "H" and "L" corresponding to black bars and white spaces in the code configuration are obtained by means of a photoelectric converter, the distance between one edge (transition point) between the black bar and white space and the next edge is converted into a count value according to a clock signal, narrow bars and narrow spaces, referenced to the count value obtained by reading the start/stop code S/S, are acknowledged, for example, as binary "0 bits", and wide bars and wide spaces as binary "1 bits", a character represented by the thus determined number of bits is decoded therefrom, and it is transferred to an information processing apparatus such as a computer.

FIG. 7 is a schematic block diagram showing a configuration of a code reading apparatus for reading such a bar code as described above, in which reference numeral 101 denotes a photoelectric converter portion, 104 denotes a counter portion, 107 denotes a decoder portion, and 110 denotes a start/stop determining portion.

In FIG. 7, the photoelectric converter portion 101 is for scanning a bar code and converting it into a two-level signal of "H" and "L" and the counter portion 104 is for counting the duration of the "H" and "L" level incoming from the photoelectric converter portion 101 according to a clock signal CL and outputting the counts. The start/stop determining portion 110 is for acknowledging the start/stop code S/S of an indicated code and controlling operations of the counter portion 104 and the decoder portion 107. The decoder portion 107 is for decoding the character code in binary data and transferring the data to an information processing apparatus.

Details of the code reading apparatus of the described type are disclosed, for example, in Japanese Patent Application No. 63-30030 and Utility Model Application No. 63-16999, both applied by the present applicant.

In the above described bar code, there are present spaces between codes (character spaces). If the character space is set to a size larger than the bar with the largest width, such a thing tends to occur that the character space is mistaken as a stop margin thereby making the decoding impossible or, since whether each bar or space constituting a code is narrow or wide is made by reference to the threshold value obtained as the count value of the preceding bar or space, a wrong determination is made as to whether the bar or space following the character space is narrow or wide. On the other hand, since the character space is for dividing up the codes, the degree of freedom for the size of the character space provided on a medium is desired to be as large as possible.

SUMMARY OF THE INVENTION

In view of the prior art with difficulties as described above, it is an object of the present invention to provide a code reading apparatus preventing occurence of code reading errors due to presence of the character space and making possible an efficient code indication.

In order to attain the above mentioned object, the present invention comprises a means for monitoring the character constituting a bar code as to the number of bars and spaces for each character (a means for detecting the character space) and comprises either a means for inhibiting the count value for the space beyond the number of bars and spaces for one character (i.e., the character space) from being delivered to the decoder portion or means replacing such a count value with a specific code which will be neglected by the decoder portion in decoding, whereby the character space in the bar code is detected and the character space is prevented from affecting the code reading.

Since the total number of bars and spaces constituting one character in a bar code is fixed, by arranging such that the monitor means counts up the transition points (edges) of bars and spaces and, when the count value exceeds a predetermined value, the clock count value for the space in excess is excluded from the objects of decoding performed by the decoder, existence of the character space can be essentially neglected.

BRIEF DESCRIPTION OF THE DRAWINGS

FIG. 1 is a diagram showing the orientation of FIGS. 1A-1C to illustrate a first embodiment of the present invention;

FIG. 1A is a diagram of the photoelectric converter portion, the first space detector portion, and the counter portion of a first embodiment of the present invention.

FIG. 1B is a diagram of the edge detector portion, and the start/stop determining portion of a first embodiment of the present invention.

FIG. 3 is a diagram showing the orientation of FIGS. 3A-3C to illustrate a second embodiment of the present invention;

FIG. 3A is a diagram of the photoelectric converter portion, the first space detector portion, and the counter portion of a second embodiment of the present invention.

FIG. 7 and 7(a)-7(c) are schematic block diagrams showing structure of a prior art code reading apparatus.

DETAILED DESCRIPTION OF THE PREFERRED EMBODIMENTS

An embodiment of the present invention will be described below with reference to the accompanying drawings.

Figure 1C:
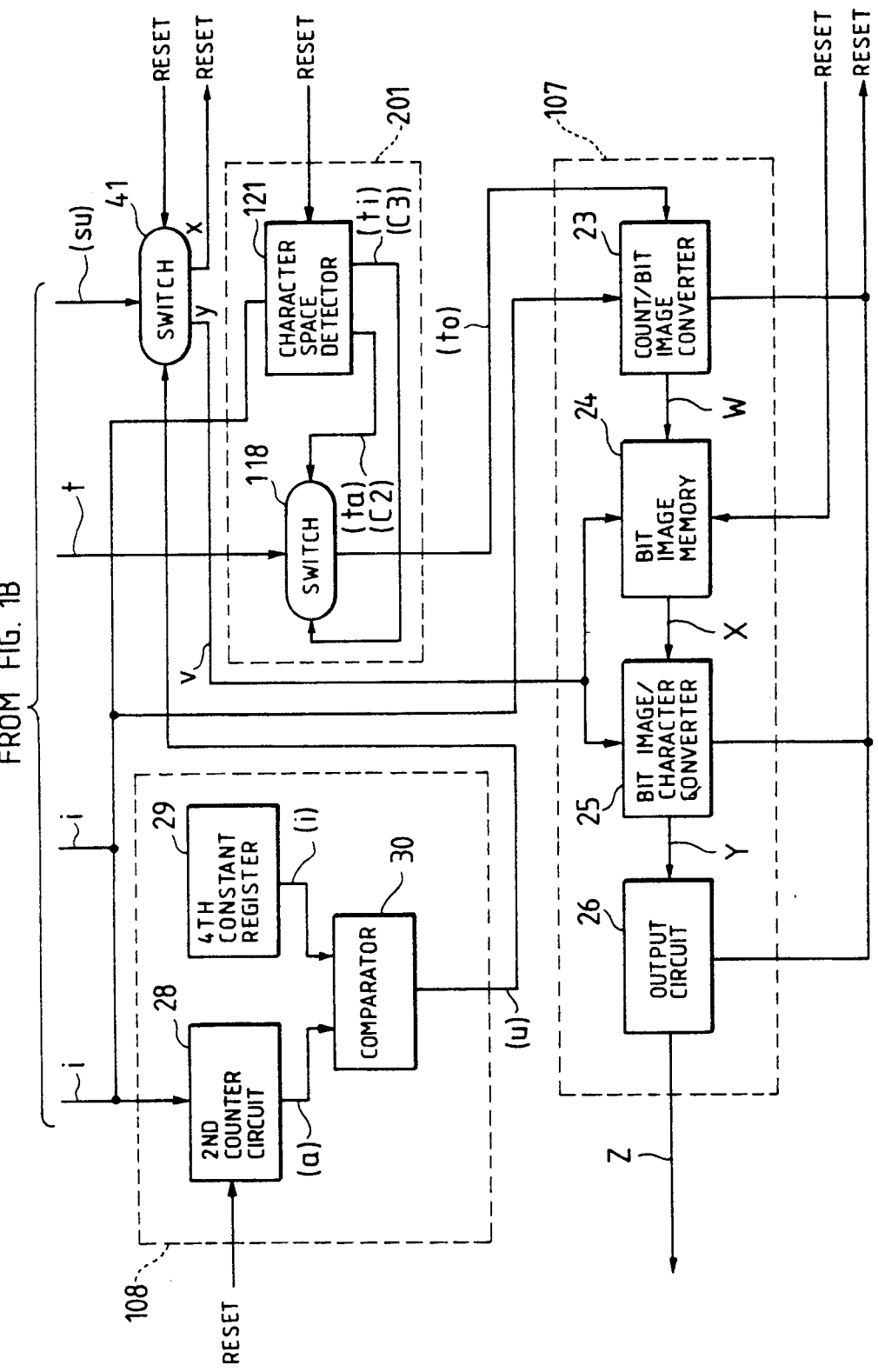
FIG. 1C is a diagram of the first bar/space determining portion, the character space processing portion, and the decoder portion of a first embodiment of the present invention.

FIG. 1 is a block diagram showing a first embodiment of the present invention, wherein reference numeral 101 denotes a photoelectric converter portion, 102 denotes a first space detector portion, 103 denotes an edge detector portion, 104 denotes a counter portion, 107 denotes a decoder portion, 108 denotes a first bar/space determining portion, 110 denotes a start/stop determining portion, and 201 denotes a character space processing portion.

Referring to the drawing, the photoelectric converter portion 101 is made up of a photoelectric converter 1 and a binarization circuit 2, and thereby, the bar code indicated on a medium by alternating two states, of which one is the space having a high reflection factor and the other is the bar having a high absorption factor, is detected and converted into an electric signal a of a predetermined voltage level by the photoelectric converter 1 and this signal is converted by the binarization circuit 2 as the detector means into a binary signal b as the read signal consisting of low levels "L" corresponding, for example, to the white spaces having a high reflection factor and high levels "H" corresponding, for example, to the black bars having a high absorption factor.

Figure 6A:
FIGS. 6(a) is a drawing showing an example of an indicated symbol of a bar code and FIG. 6(b) is a drawing for explaining the structure of the code.

The first space detector portion 102 is made up of a switch 3 and a space detector 4 and therein the binary signal b from the photoelectric converter portion 101 is delivered via a switch 3 to a space detector 4 or a switch 5 in the edge detector portion 103. The switch 3, in the initial state, is set by a reset signal to make a connection at the side of the space detector 4 (side x). The photoelectric converter portion 101, when starting a scan from the front position of the indication of the bar code as shown in FIG. 6(a) (from left to right in the drawing), supplies an "L" signal to the space detector 4 while it is at the space in front of the indicated position (space margin) of the bar code.

Upon detection of the space margin by the space detector 4, the detected signal e switches the switch 3 over to the side y.

Thereby, the signal b over the output line of the photoelectric converter portion 101 is introduced through the switch 3 to the switch 5 as a signal d. Since the switch 5 is set by a reset signal to make a connection at the side x, the signal d is transferred to a first edge detector 6 as a signal f.

The first edge detector 6, when the signal f changes from the space to a bar ("L"→"H"), detects the change and outputs a signal h. This signal (edge detection signal) switches the switch 5 over to the side y and also enters, through an OR circuit 44, a first counter 8 in the counter portion 104, and the first counter 8, responding to this signal, clears its count value to zero and starts counting a clock CL. The first counter 8 also clears its counts to zero and starts counting upon receipt of a reset signal or an output signal i from a later described second edge detector 7 incoming through the OR circuit 44 and delivers its count value (signal j). The counted value by the first counter 8 is compared with an overflow value set in a first constant register 9 by an overflow comparator 10, and in the event of an overflow occurring in the counter (in the case, for example, where the scanner is stopped midway through the scanning), a reset signal is output from the overflow comparator and thereby the reading operation is stopped.

Now, the second edge detector 7, as a result of the detection of the first edge by the first edge detector 6, receives the signal from the photoelectric converter portion 101 through the switches 3 and 5 as a signal g, and, upon detection of a change in the input signal g ("H"→"L" or "L"→"H"), supplies the detection signal i to the first counter 8, a second counter circuit 28 of the first bar/space determining portion 108, a switch 32 of the start/stop determining portion 110, a switch 39, a character space detector 121 of the character space processing portion 201, and a count/bit image converter 23 of the decoder portion 107.

The first bar/space determining portion 108 counts the sum total of the bars and spaces after the first bar has been detected (the contents of the second counter circuit 28) and outputs a signal (u) when the sum total reaches a preset value in a fourth constant register 29 (namely, it is counting the number of the spaces and bars for determining a start).

More particularly, the second counter circuit 28, responding to the signal i, gives sequential increments to its counter and outputs the counts as a signal (a). It is to be noted that the counter circuit 28 is cleared to zero by a reset signal. In the fourth constant register 29, there is set the number (two or above) of the sum total of the bars and spaces to be used for the determination of the start of a bar code and this numeral value (signal (i)) is sent to a comparator 30. The comparator 30 compares the signal (a) (count value) from the second counter circuit 28 with the set value (signal (i)) from the fourth constant register 29 and, when the count value has reached the set value in the fourth constant register, outputs the signal (u).

The signal (u) is supplied to a switch 41, and thereby, the output signal of the start/stop determining portion 110 is supplied through this switch 41 to the decoder portion 107. That is, after the time point when the first bar/space determination signal (start margin determining signal) from the first bar/space determining portion 108 was supplied to the switch 41, the output signal from the start/stop determining portion 110 is supplied to the decoder portion 107 whereby the decoder operation is controlled.

The counter portion 104 is made up of the first counter circuit 8, the first constant register 9, and the overflow comparator 10, and the first counter circuit 8 counts the clock signal CL between two adjoining edge signals incoming from the edge detector portion 103 and supplies the count value j through a switch 11 to the start/stop determining portion 110.

The first constant register 9 stores therein a numeral value which is over a count value that will be counted in the normal operating condition, so that, in such a case where the movement of the photoelectric converter is stopped midway through the scanning, a signal (si) indicating that an overflow has occurred is issued from the overflow comparator 10 to be supplied through an OR circuit 45 to the switch 41, and thereby, a reset signal is output from its side x to reset the reading apparatus.

The start/stop determining portion 110 is made up of a count memory 12 for storing the counted value by the first counter circuit 8, a fifth constant register 33 in which a numeral value corresponding to a value larger than the value (wide bar or space)/(slow scan speed) is set, a preceding count memory 35 for storing a preceding count value, a sixth constant register 36 in which a numeral value corresponding to a value larger than the value (wide bar or space)/(narrow bar or space) is set, a multiplier 37, a margin comparator 38, and switches 32 and 34.

When the count value in the above described counter portion 104 for the distance between adjoining edges does not exceed the overflow value set in the first constant register 9, the counted value by the first counter circuit 8 stored through the switch 11 in the count memory 12 as a signal 1 is supplied to a switch 39 as a signal m. This signal, after being passed through the switch 39, is further passed as a signal t through a switch 118 of the later described character space processing portion 201 and supplied to the decoder portion 107 as a signal (to).

The start/stop determining portion 110 compares the count values, at least, of the first bar and space counted by the counter portion 104 and determines the start of the code on condition that the count value of the space or bar is below the preceding count value of the space bar multiplied by a constant. At this time, the determination of the start of the code by the start/stop determining portion 110 is effected when the counted number by the first bar/space determining portion 108 of the sum total of the bars and spaces after the first bar was detected has reached a predetermined value.

If the count value of the space or bar is judged by the start/stop determining portion 110 to be over the preceding count value of the space or bar multiplied by a constant (the set value in the sixth constant register 36), the determination of the start is not effected and a reset signal is issued through the switch 41 whereby the apparatus is reset.

As for the determination of the stop of the bar code, when the start/stop determining portion 110, after it determined the start, detects that the count value of a bar or space being read currently has become larger than the count value of the preceding space or bar, it determines the stop, and the decoding operation in the decoder portion 107 is controlled accordingly by this determination of the stop.

The decoder portion 107, made up of a count/bit image converter 23, bit image memory 24, bit image/character converter 25, and output circuit 26, receives the count value of the clock CL corresponding to the bar or space that has been read of the bar code (the value stored in the count memory 12) through the switches 39 and 118 as the signal (to) and decodes the bar code and obtains the information it represents.

The count/bit image converter 23 operating dependent on the detection signal i from the second edge detector 7 converts the count value received from the signal line (to) into a bit image and stores it in the bit image memory 24 through a signal line W. When an error occurs during the conversion, it outputs a reset signal. The bit image memory, first, stores the bit image from the signal line W, secondly, delivers the bit image stored therein to the bit image/character converter 25 responding to a signal from a signal line V, and thirdly, clears the bit image stored therein upon receipt of a reset signal.

The bit image/character converter 25 starts operation upon receipt of the signal from the signal line V and converts the bit image received from the bit image memory 24 into a character and supplies the information through a signal line Y to the output circuit 26. When an error occurs during the conversion into character, it outputs a reset signal.

The output circuit 26 transmits the character signal from the signal line Y over an output line Z so that it may be supplied to an information processing apparatus not shown, and upon completion of the transmission, it issues a reset signal.

As described above, it is aimed in the present invention to prevent, when a plurality of character codes C1 to C5 are indicated on a medium in the scanning direction with character spaces CS interposed therebetween, the character space from affecting the threshold value for determining a bar or space of the following character code to be whether narrow or wide, and to achieve this aim, there is provided the character space processing portion 201 in the stage at the rear of the counter portion.

In the embodiment shown in FIG. 1, the character space processing portion 201 is made up of the character space detector 121 and the switch 118. The character space detector 121 introduces the second edge detection signal i output from the second edge detector 7 of the edge detector portion 103 and counts the number of the signals. While it is counting the number of edges for one character code, it keeps the switch 118 in ON state by outputting a signal (ti), whereby the signal t, the output m of the count memory 12 passed through the switch 39, is supplied as the signal (to) to the count/bit image converter 23 of the decoder portion 107. When the character space detector 121 counts up all the edges for one character, it outputs a signal (ta) and turns off the switch 118, whereby supply of the clock count signal to the decoder portion is inhibited.

Figure 2:
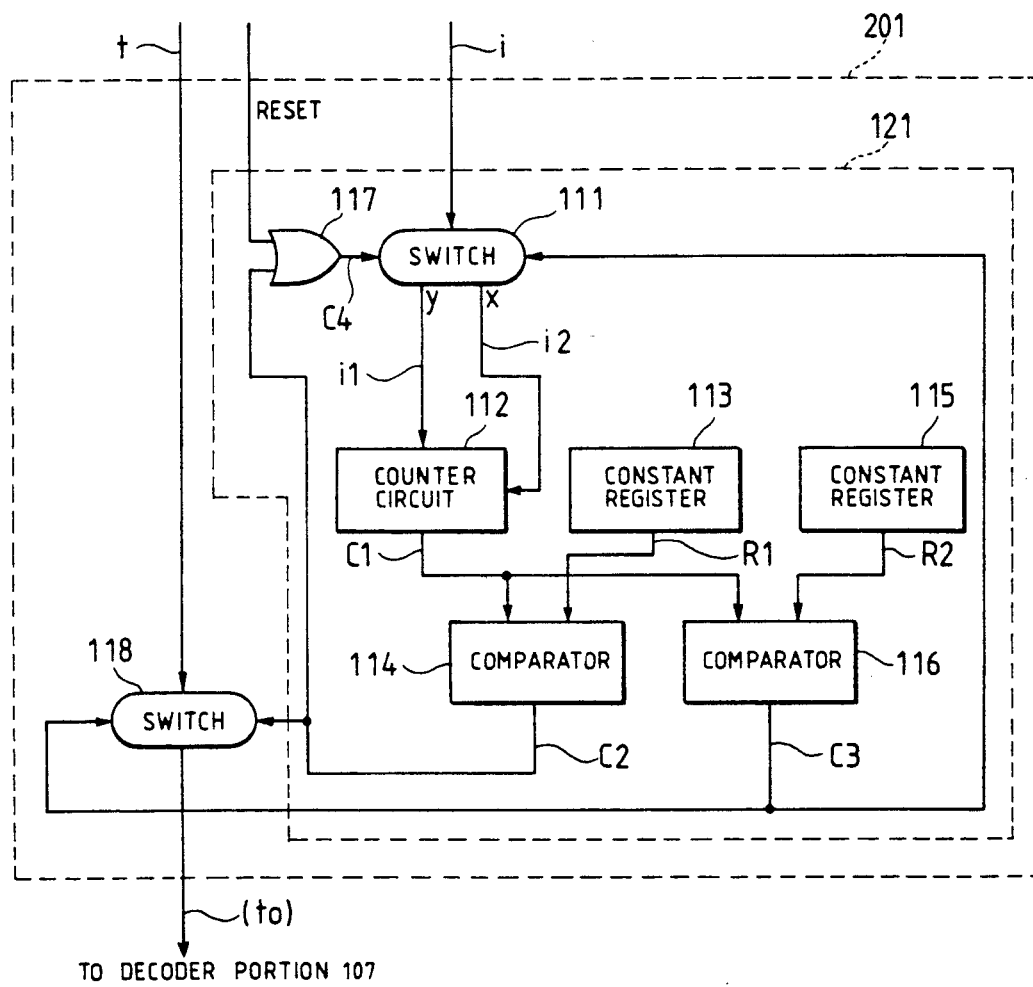
FIG. 2 is a block diagram showing a configuration of a character space processing portion.

FIG. 2 is a block diagram showing a configuration of the character space processing portion made up of the switch 118 and the character space detector 121. The character space detector 121 is formed of a switch 111, a counter circuit 112 for counting the number of edges, a constant register 113 in which the number of edges for one character of the bar code (for example, "9" in the 3 of 9 code, or "7" in the NW-7 code) is set, a comparator 114 for comparing the edge count value C1 by the counter circuit 112 with a set value R1 in the constant register 113 and, when these values come into coincidence, outputting the coincidence output C2 (signal (ta) in FIG. 1), a constant register 115 in which "0" is set, a comparator 116 for comparing the output C1 of the counter circuit 121 with the set value in the constant register 115 and, when these values come into coincidence, outputting the coincidence signal C3 (signal (ti) in FIG. 1), and an OR circuit 117. Incidentally, denoted by 118 is the switch 118 shown in FIG. 1.

Figure 6B:
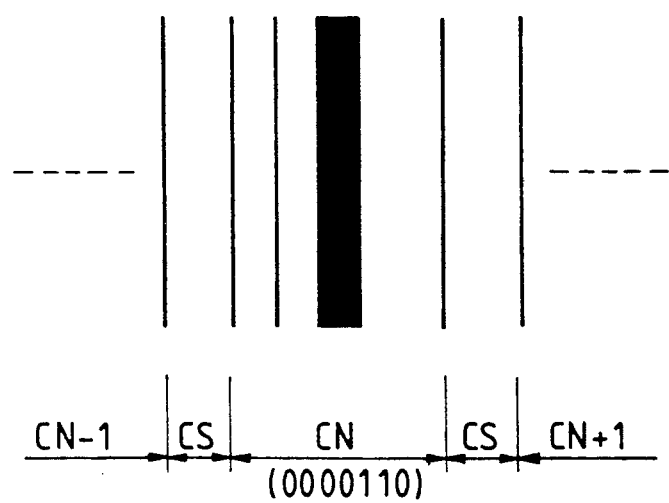
Figure 7:
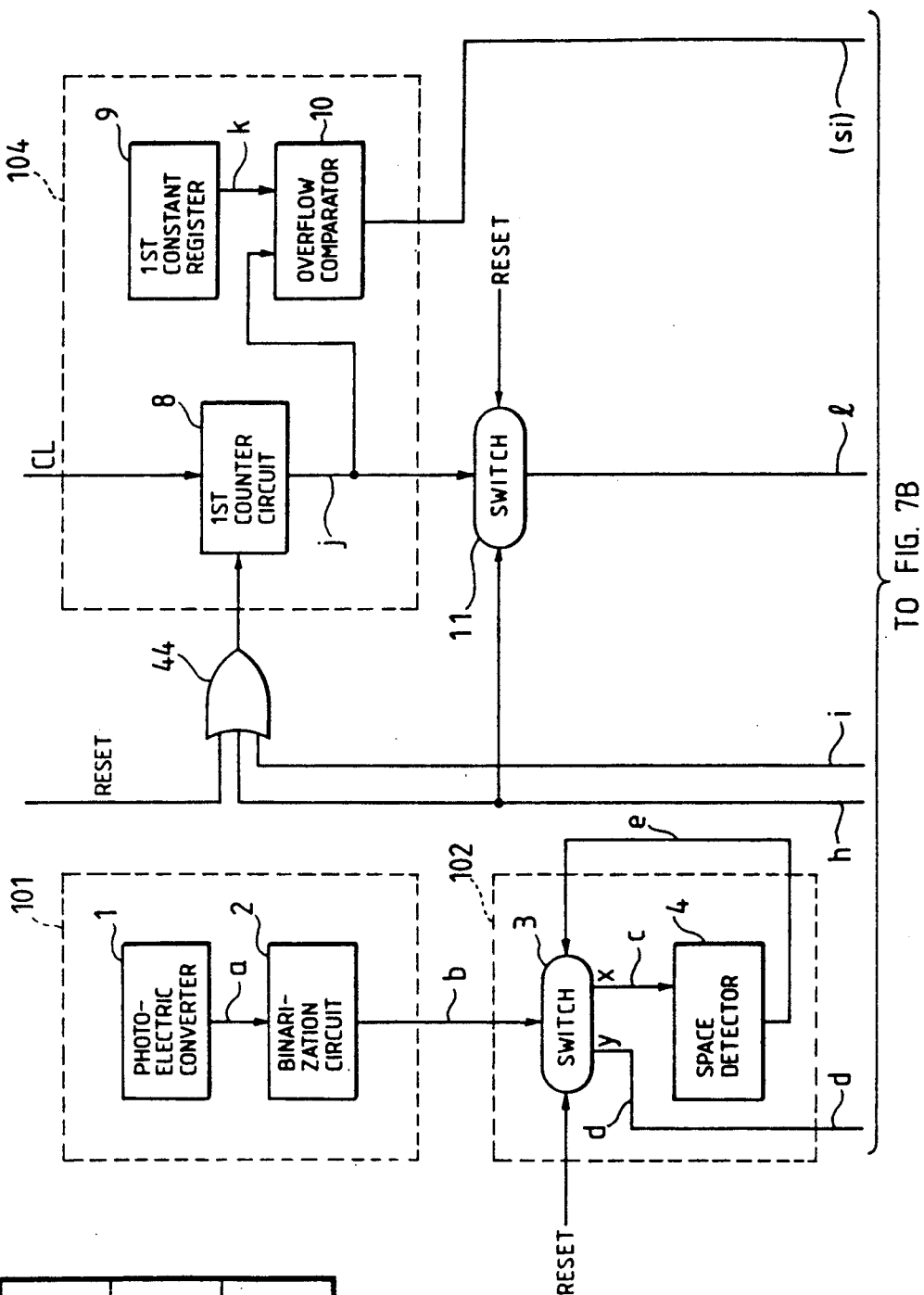
Figure 7B:
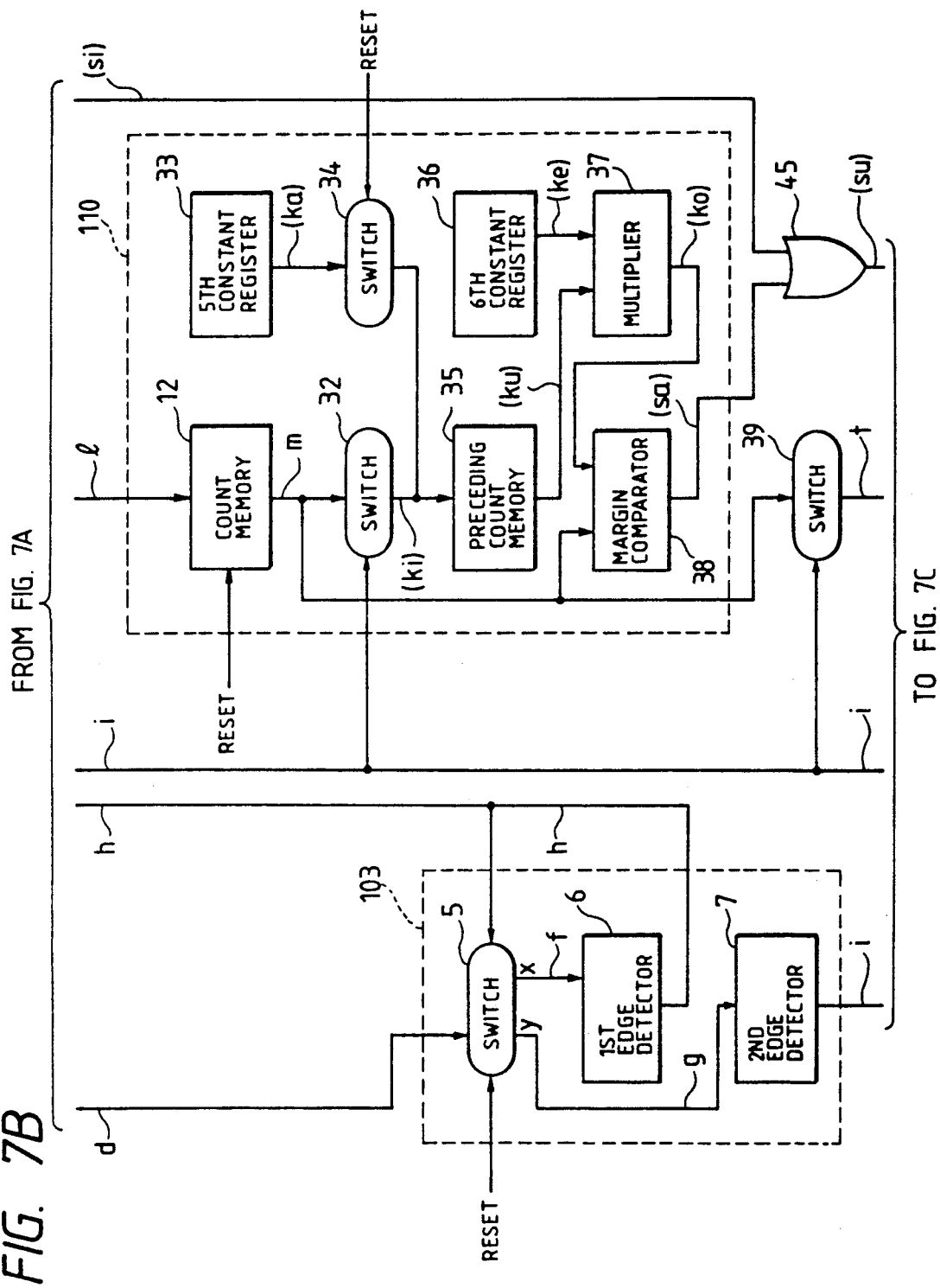
Figure 7C:
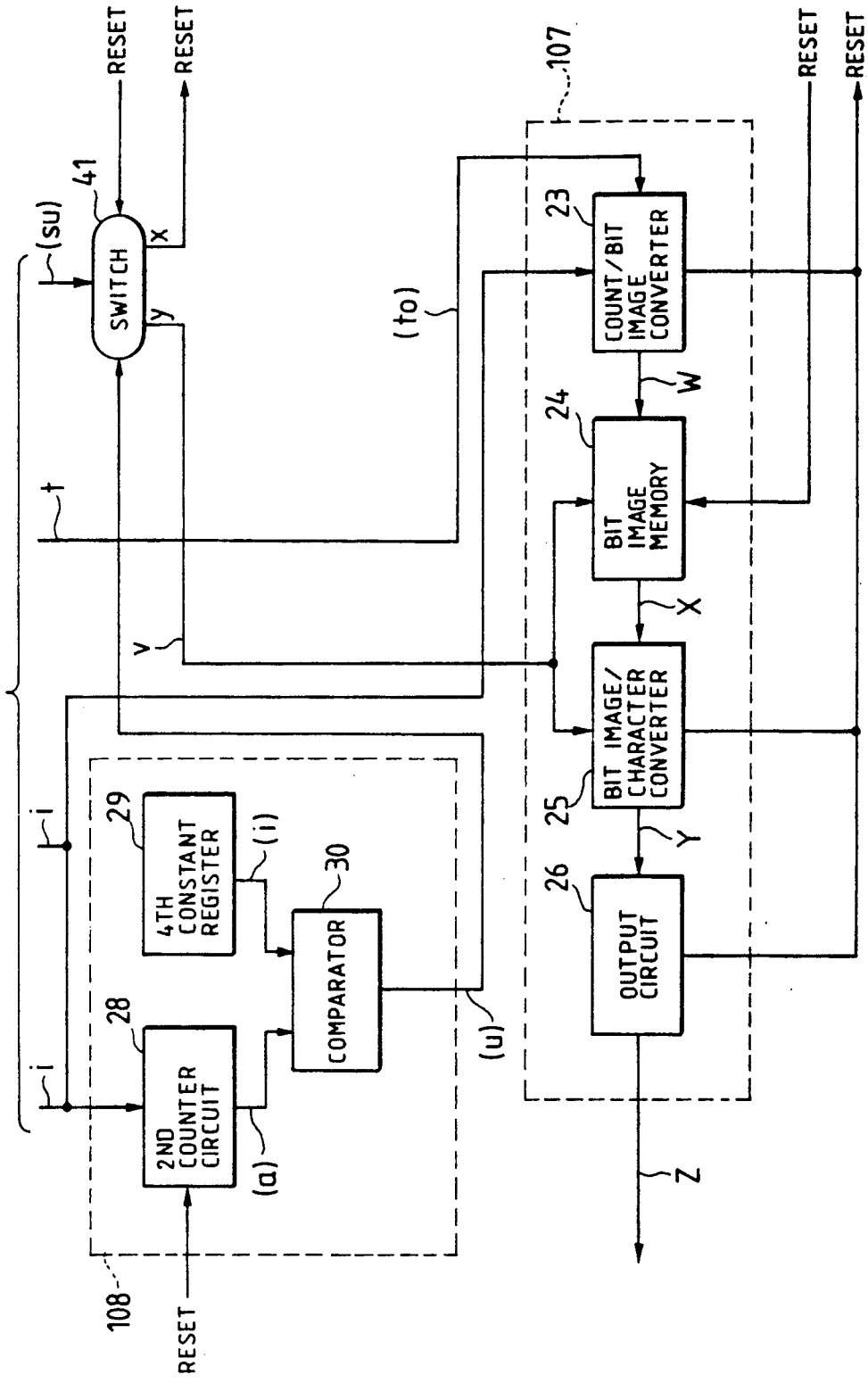

Referring to FIG. 2, the character space detector 121, during the period when the character space CS shown in FIG. 6 is read, functions to keep the switch 118 in OFF state so that the signal t indicative of the clock count value from the count memory 12 is inhibited from being conducted to the decoder portion 107, and during the period when the character C1–C5 is read, functions to keep the switch 118 in ON state so that the signal t for the count value is supplied as the signal (to) to the decoder portion 107.

The switch 111 constituting the character space detector 121, upon receipt of a reset signal or the signal C2 as the output signal of the comparator 114 through the OR circuit 117, switches over to the side x, whereby the signal i is turned into a signal 12 and supplied to the reset terminal of the counter circuit 112 to reset this counter circuit 112. Further, the switch 111, upon receipt of the output signal C3 of the comparator 116, switches over to the side y, whereby the signal i is turned into a signal i1 and supplied to the count input of the counter circuit 112. The counter 112 counts upward every edge detection signal input from the edge detector portion and supplies the count value to the comparators 114 and 116 as the signal C1.

The comparator 114 compares the signal C1 indicative of the counted value of edges input from the counter circuit 112, the counted sum total of bars and spaces, with the set value R1 in the constant register 113 representative of the number of the bars and spaces for one character, and, when the signal C1 coincides with the set value R1, outputs the coincidence signal C2. This coincidence signal C2 is a signal indicative of an end of one character, i.e., a start of a character space. This signal C2 turns off the switch 118 thereby inhibiting the clock count signal t incoming from the count memory 12 from being supplied as the signal (to) to the decoder portion 107.

On the other hand, since "0" is set in the constant register 115, when the signal R2 for the set value "0" and the output signal C1 of the counter circuit 112 are "0", namely, when the counter circuit 112 is reset (at the end of a character space), the coincidence signal C3 is output from the comparator 116. This coincidence signal C3 turns on the switch 118 and thereby supplies the clock count signal t to decoder portion 107 as the signal (to), and also switches the switch 111 over to the side y so that the edge detection signal i from the edge detector portion 103 is supplied as the signal i1 to the counter circuit 112.

With the described arrangement, the clock count value m in the count memory 12 of the start/stop determining portion 110 storing the count value j according to the clock signal CL of the distance between edges of the bar and space, which has been counted by the first counter circuit 8 of the counter portion 104 in FIG. 1, is allowed to enter the decoder portion 107 while the bar/space constituting the character is read, but the count value is inhibited from being supplied to the decoder portion 107 while the character space is read. Thus, the character space can be neglected in substance, and thereby, the existence of the character space can be prevented from affecting the threshold value as the criterion for determining the bar/space.

In the decoder portion 107, the clock count value input thereto is converted into the bit image in the count/bit image converter 23 and the thus obtained bit image signal W is stored in the bit image memory 24. The contents of the bit image memory 24 are supplied as the signal X to the bit image/character converter 25 to be thereby converted into a character signal, and the thus obtained character signal Y is supplied through the output circuit 26 as read data Z to an information processing apparatus.

Figure 3B:
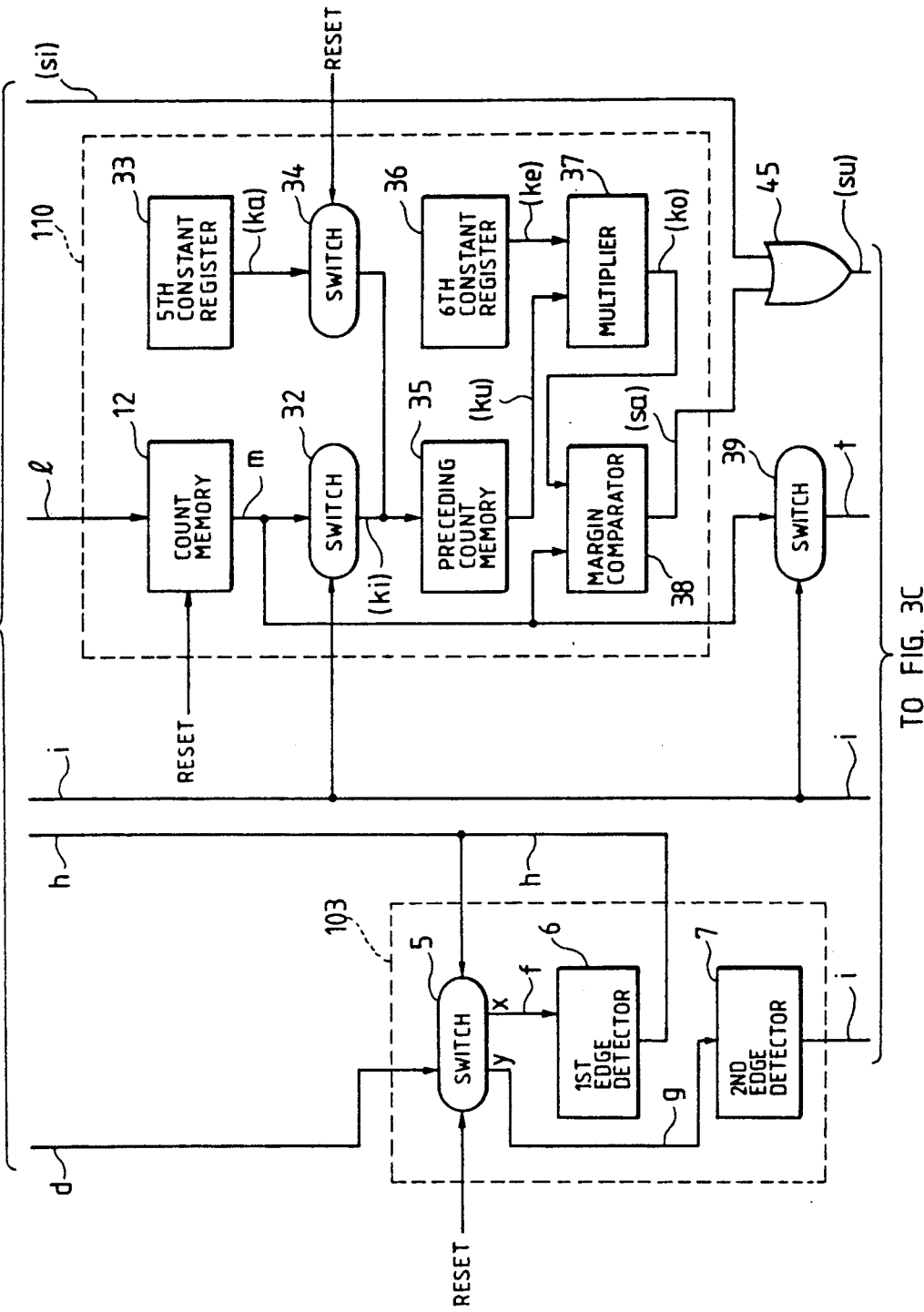
FIG. 3B is a diagram of the edge detector portion, and the start/stop determining portion of a second embodiment of the present invention.
Figure 3C:
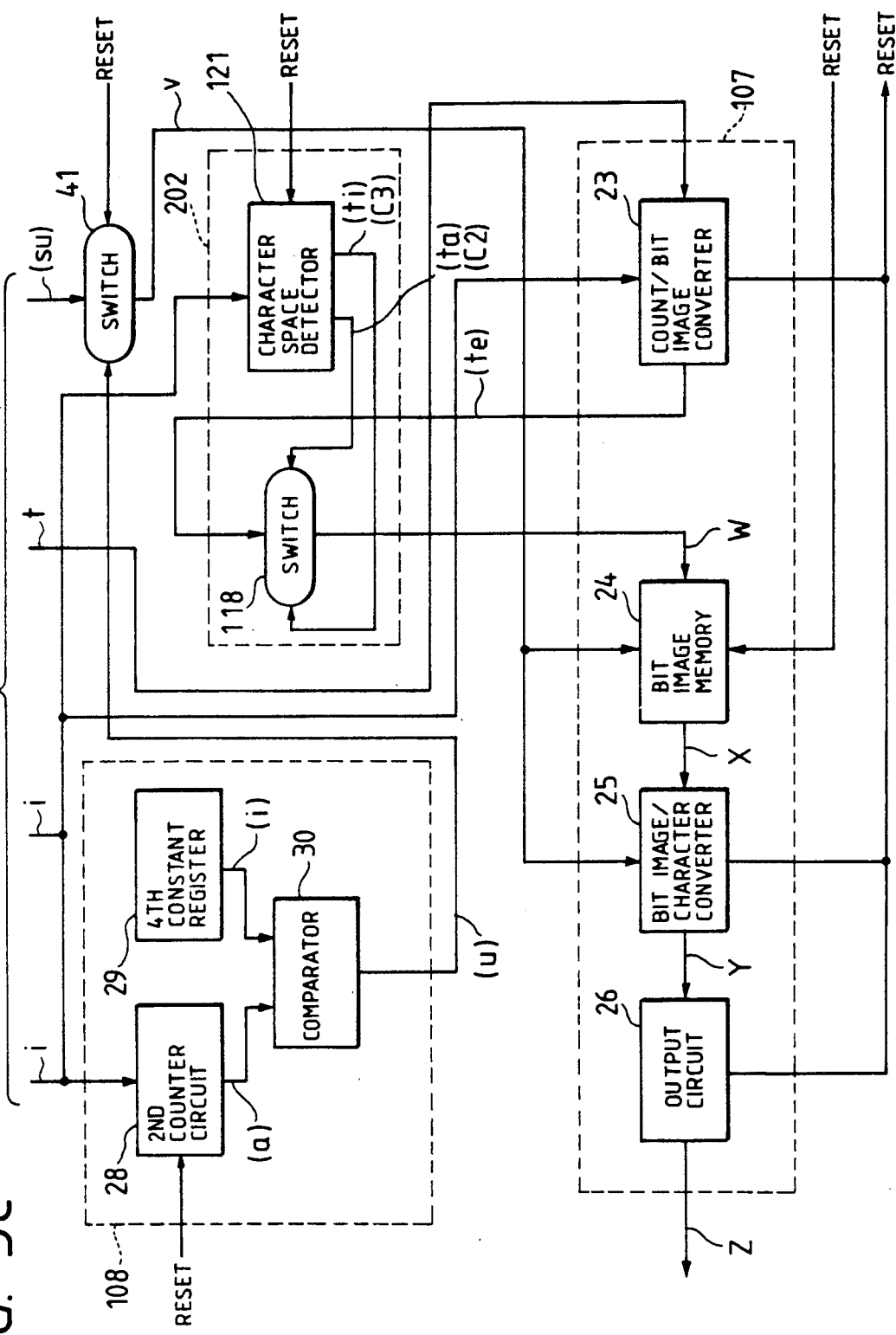
FIG. 3C is a diagram of the first bar/space determining portion, the character space processing portion, and the decoder portion of a second embodiment of the present invention.

FIG. 3 is a block diagram showing a second embodiment of the present invention, in which like reference numerals to those in FIG. 1 denote corresponding parts. Reference numeral 202 denotes the character space processing portion in the present embodiment whose configuration is the same as that in FIG. 2.

The present embodiment is different from the embodiment of FIG. 1 in that the character space processing portion 202 is arranged to be operative between the count/bit image converter 23 and the bit image memory 24. Since other operations are similar to those in FIG. 1 explanation thereof will be omitted.

Referring to FIG. 3, the clock count value m stored in the count memory 12 is supplied through the switch 39, which is turned on by the edge detection signal i of the second edge detector 7 of the edge detector portion 103, to the count/bit image converter 23 of the decoder portion 107 as the signal t. A converted signal (te) by the count/bit image converter 23 is supplied to the switch 118. The character space detector 121 counts the edge detection signal i from the second edge detector 7 and keeps the switch 118 in ON state using the signal (ti) (signal C3 in FIG. 2) while counting the number of bar/space edges for one character, thereby supplying the output (te) converted into bit image by the count/bit image converter 23 to the bit image memory 24 as the signal W. Upon counting up all the edges for one character, the character space detector 121 outputs the signal (ta) (signal C3 in FIG. 2) thereby turning off the switch 118.

With the described arrangement, the bit image signal corresponding to the clock count value for the character space is prevented from being supplied to the bit image memory, and thereby, the character space can be neglected in substance. Hence, as in the first embodiment, reading errors due to existence of the character space can be prevented from occurring.

Figure 4A:
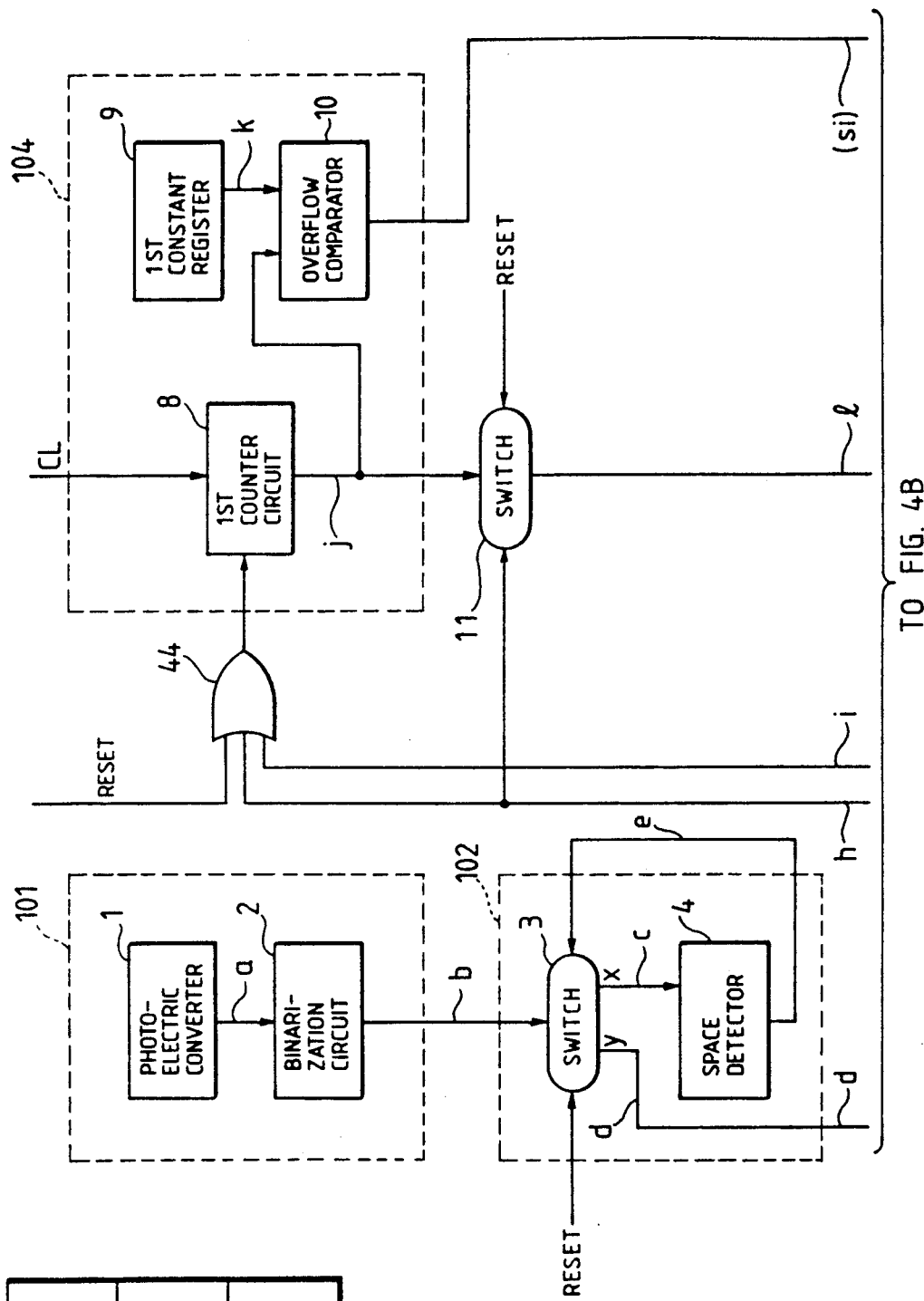
FIG. 4A is a diagram of the photoelectric converter portion, the first space detector portion, and the counter portion of a third embodiment of the present invention.
Figure 4:
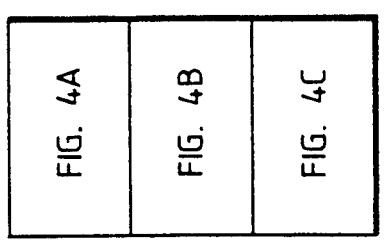
FIG. 4 is a diagram showing the orientation of FIGS. 4A-4C to illustrate a third embodiment of the present invention.
Figure 4B:
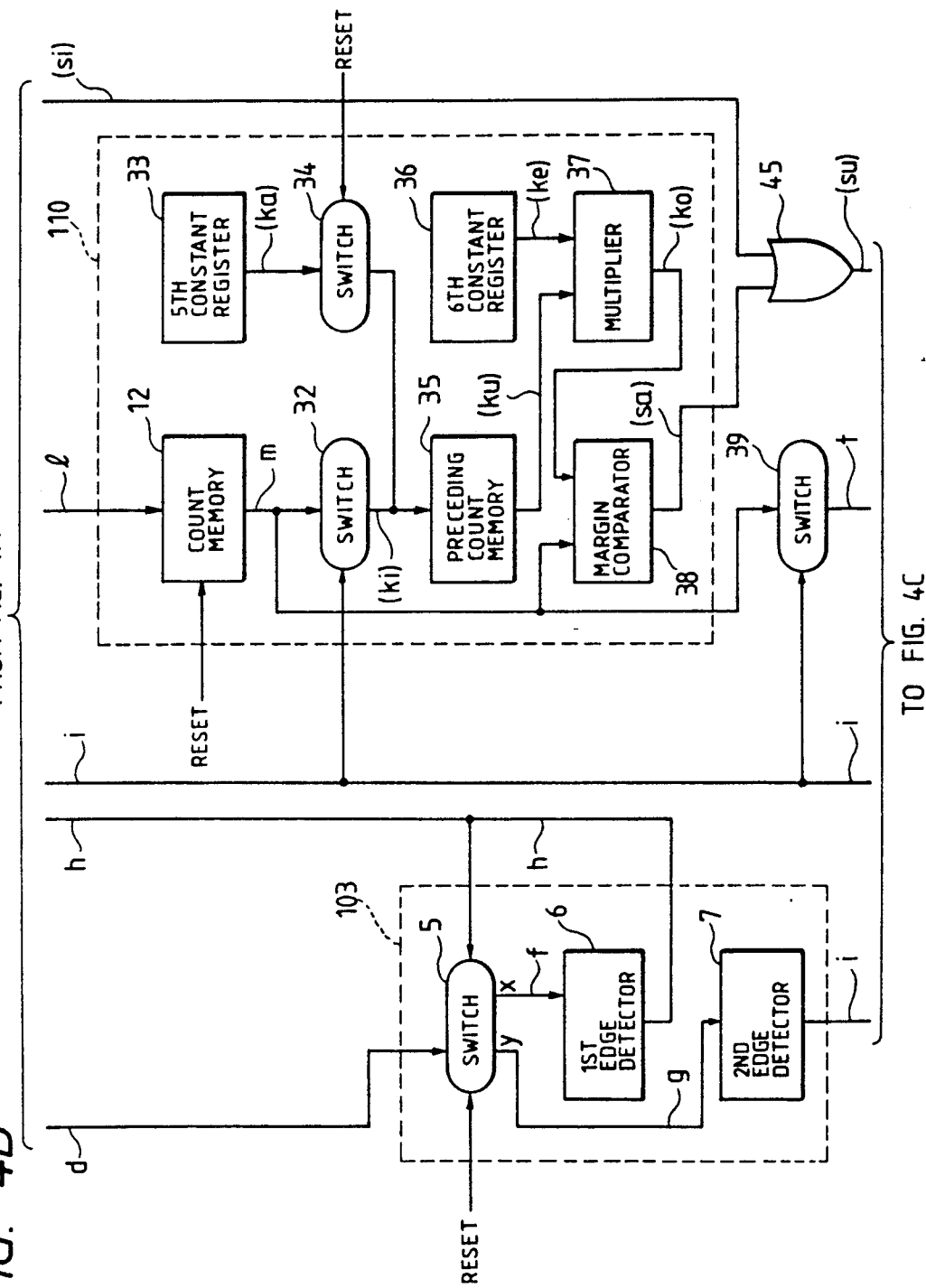
FIG. 4B is a diagram of the edge detector portion, and the start/stop determining portion of a third embodiment of the present invention.
Figure 4C:
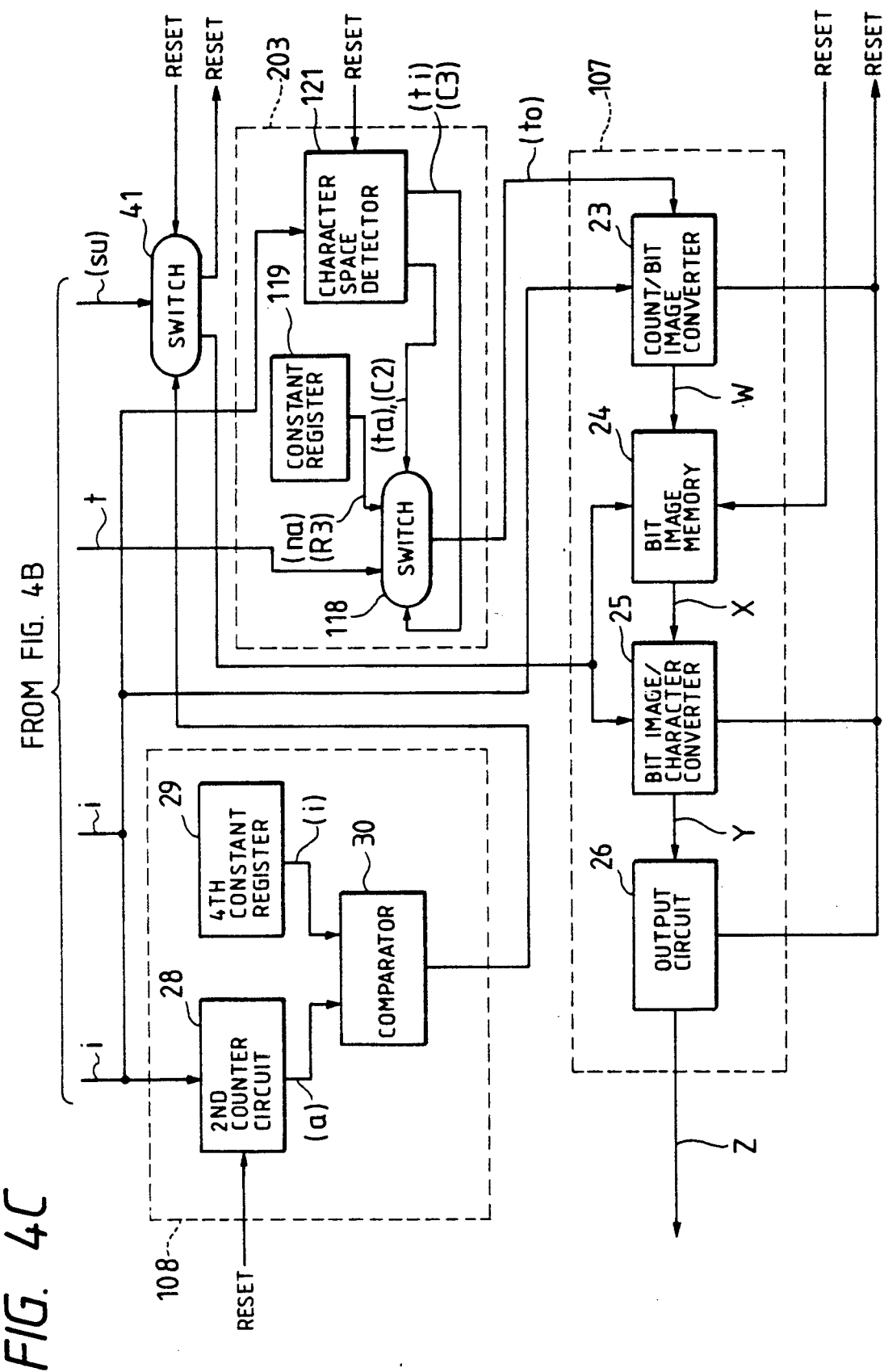
FIG. 4C is a diagram of the first bar/space determining portion, the character space processing portion, and the decoder portion of a third embodiment of the present invention.

FIG. 4 is a block diagram showing a third embodiment of the present invention, in which like reference numerals to those in FIG. 1 and FIG. 2 denote corresponding parts and reference numeral 203 denotes a character space processing portion in the present embodiment.

Since operations in the present embodiment, except that in the character space processing portion 203, are similar to those in the configuration of FIG. 1 explanation thereof will be omitted.

Referring to FIG. 4, the character space processing portion 203 is provided in the rear of the count memory 12 of the start/stop determining portion 110 storing the counted value by the counter portion 104 and in the front of the decoder portion 107 the same as in FIG. 1. Here, however, it is arranged such that, instead of the count value for the character space, such a specific value as will be neglected in decoding (not taken as the object of decoding) by the decoder portion 107 is supplied thereto, and as the result, decoding errors due to the character space are prevented from occurring.

The character space processing portion 203 is made up of a switch 118, a constant register 119, and a character space detector 121.

Although the count value stored in the count memory 12 is supplied to the decoder portion 107 while the character space detector 121 is counting the bar/space edges for one character, it is adapted such that a specific value stored in the constant register 119 is supplied to the decoder portion 107 during the period corresponding to the character space.

Figure 5:
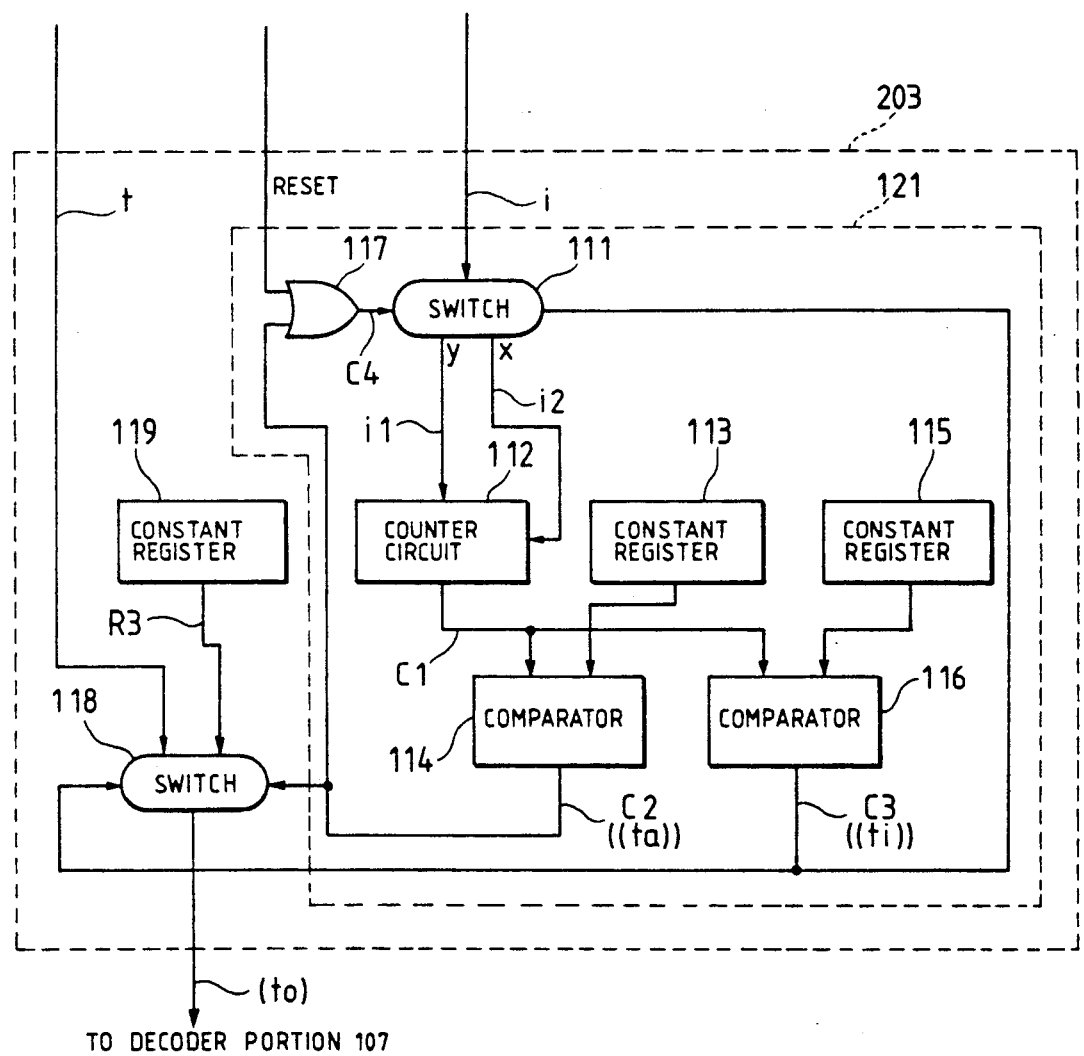
FIG. 5 is a block diagram showing a configuration of a character space processing portion in FIG. 4C.

FIG. 5 is a block diagram showing the configuration of the character space processing portion 203 in FIG. 4, in which like reference numerals to those in FIG. 2 denote corresponding parts and reference numeral 119 denotes the constant register as a means for setting a specific value therein. The specific value set in the constant register 119 is for example "0" or an overflow value, which does not belong to the category of the objects of decoding to be performed by the decoder portion 107. Here, "0" will be used as the specific value in the following explanation.

The character space detector 121 constituting the character space processing portion 203 has the same configuration as that in FIG. 2 has and its operation is also the same, and hence detailed explanation thereof will be omitted. The edge detection signal i is supplied through the switch 111 to the counter circuit 112 as the signal i1, and thereby, while the counter circuit 112 is counting the number of spaces/bars for one character, the count value t by the first counter circuit 8 of the counter portion 104 stored in the count memory 12 in FIG. 4 is supplied through the switch 118 as the signal (to) to the decoder portion 107. When the counter circuit 112 has counted up all the bars/spaces for one character, the coincidence signal C2 (signal (ta) in FIG. 4) is supplied to the switch 118 so that it is switched over to the side of the constant register 119. Thereby, the specific value "0" set in the constant register 119 is supplied as a signal R3 to the decoder portion 107 through the switch 118. The signal C2 is also supplied through the OR circuit 117 to the switch 111 to switch it over to the side x so that the signal i2 resets the counter circuit 112. Hence, the counter circuit 112 clears the count value of the preceding character, and as a result, its contents "0" comes into coincidence with the set value "0" in the constant register 115. Thereupon, the coincidence signal C3 is output from the comparator 116 to cause the switch 111 to be switched over to the side y and at the same time to cause the switch 118 to be switched over to the side of the count memory 12 so that it becomes ready for the counting of the edges of the character following the character space.

The decoder portion 107, in the same way as in FIG. 1, converts the supplied signal (to) for the count value into a bit image and stores the converted bit image for a character in the bit image memory 24, and then converts it into a character in the bit image/character converter 25 and transfers the character through the output circuit 26 to an information processing apparatus. In the above processing, the bit image corresponding to the value supplied from the constant register 119 of FIG. 5 is not that belongs to the category of objects of conversion in the conversion into character and therefore it is neglected.

By arranging as described above, even if the character space is large in size, it does not affect the threshold value in the conversion of the bar code into bit images.

As described so far, it is made possible by the present invention to avoid such trouble as that the clock count value of the character space, when the character space is set to a size larger than the largest bar width, affects the threshold value as the decoding criterion for determining the bars/spaces constituting a character thereby making impossible a normal conversion of the bar code into bit images. Thus, a code reading apparatus in which a high degree of freedom for the size of the character space is attained and the reading efficiency is greatly enhanced can be provided.

What is claimed is:

1. A bar code reading and decoding apparatus comprising:
   a photoelectric converter portion for reading a bar code and converting said bar code into binary-coded signals, said bar code having a plurality of character codes separated by character space codes between start codes and stop codes which are optically indicated by bars and spaces arranged alternately on a medium;
   an edge detector portion for detecting the boundary between one said space and one said bar in accordance with said binary-coded signals from said photoelectric converter portion and for outputting an edge signal upon detection of said boundary;
   a counter portion for counting, on the basis of a clock signal, the time interval between successive edge signals output from said edge detector portion and outputting a count signal;
   a start/stop determining portion for comparing said count signal to a preceding count signal multiplied by a constant to effect a start or stop;
   a decoder portion for decoding said character codes of said bar code in response to said count signals to form decoded signals which are processable by an information processing device; and
   a character space processing portion including a character space detection portion for counting the number of edges represented by said edge signals from said edge detecting portion and comparing said edge number to a stored character length signal representing the number of edges corresponding to one character code, so as to identify said character space codes between said character codes, thereby outputting a partition code detection signal, and said character space processing portion further including a decode control means for prohibiting the decoding operation of said decoder portion in accordance with said partition code detection signal, thereby preventing erroneous decoding.

2. A bar code reading and decoding apparatus according to claim 1, wherein said decode control means supplies said decoding portion with a signal formed by subtracting said partition code detection signal from said count signal output from said counter portion.

3. A bar code reading and decoding apparatus according to claim 1, wherein said decoder portion includes a count/bit image converter means for converting the count signal from said counter portion into a bit image signal, and wherein said decoder portion further includes a bit image/character converter means for forming a character image decoded signal on the basis of said bit image signal output from said bit image converter means; and wherein said decode control means includes means for preventing transfer of said bit image signal to said character converter means in accordance with said partition code detection signal.

4. A bar code reading and decoding apparatus according to claim 1, wherein said character space detection portion outputs a code signal indicative of non-detection of said partition code;

wherein said decode control means includes a memory means for storing a non-character code signal which is a specific count value different from that of said count signal and which supplies said non-character code signal to said decoder portion; and wherein said decode control means further includes signal switching means for supplying said decoder portion with said non-character code signal from said memory means in response to said partition code detection signal.

5. A bar code reading and decoding apparatus comprising:

a photoelectric converter portion for reading a bar code and converting said bar code into binary-coded signals, said bar code having a plurality of character codes separated by character spaces between start codes and stop codes, all said codes being optically indicated by bars and spaces arranged alternately on a medium;

an edge detector portion for detecting the boundary between one of said spaces and one of said bars in accordance with said binary-coded signals from said photoelectric converter portion and for outputting an edge signal upon detection of said boundary;

a counter portion for counting, on the basis of a clock signal, the time interval between successive edge signals output from said edge detector portion and outputting a count signal;

a character space processing portion having means for detecting character spaces existing between said start and said stop codes and between said character codes and;

a decoder portion for decoding said character codes of said bar code in response to said count signals and a stored count value to form decoded signals which are processable by an information processing device;

wherein said character space processing portion includes specific value setting means for setting therein a specific value different from said count value of said decoder portion, and wherein said character space processing portion is adapted such that said specific value is supplied to said decoder portion based on the detection signal from said detector means.

* * * * *